United States Patent [19]

Davidson

[11] 4,256,285
[45] Mar. 17, 1981

[54] ECCENTRIC ROTARY VALVE WITH CONTROL-IMPROVING WING MEMBER

[75] Inventor: James V. Davidson, Lansdale, Pa.

[73] Assignee: Honeywell Inc., Minneapolis, Minn.

[21] Appl. No.: 45,209

[22] Filed: Jun. 4, 1979

Related U.S. Application Data

[63] Continuation of Ser. No. 811,536, Jun. 30, 1977, abandoned.

[51] Int. Cl.³ .................. F16K 39/06; F16K 1/20
[52] U.S. Cl. .................................. 251/283; 251/298
[58] Field of Search ............... 251/283, 298, 309, 304

[56] References Cited

U.S. PATENT DOCUMENTS

| | | | |
|---|---|---|---|
| 3,475,003 | 10/1969 | Paluszek | 251/283 |
| 3,937,441 | 2/1976 | Baumann | 251/298 |
| 3,963,211 | 6/1976 | Myers | 251/298 |
| 4,103,868 | 8/1978 | Thompson | 251/283 |
| 4,193,578 | 3/1980 | Brumm | 251/283 |

FOREIGN PATENT DOCUMENTS

| | | | |
|---|---|---|---|
| 1600836 | 6/1967 | Fed. Rep. of Germany | 251/298 |
| 2553155 | 11/1975 | Fed. Rep. of Germany | |
| 671322 | 4/1952 | United Kingdom | |
| 1024952 | 4/1966 | United Kingdom | |
| 1217404 | 12/1970 | United Kingdom | |
| 1348748 | 3/1974 | United Kingdom | |

*Primary Examiner*—William R. Cline
*Assistant Examiner*—H. Jay Spiegel
*Attorney, Agent, or Firm*—Laurence J. Marhoefer; Lockwood D. Burton; Mitchell J. Halista

[57] ABSTRACT

The two supports for the plug in an eccentric rotary valve are joined and rotatively coupled by a wing member. As the plug is rotated from its closed position on the cooperating seat by the rotation of a shaft fixed to one of the plug supports, the wing member lies in the fluid flowing through the valve. This fluid flow causes the wing member to exert a rotative force on the shaft in the direction to move the plug in its valve-opening direction. This force shifts the inherently unstable control region of a rotative force, which the fluid flow causes the plug to exert on the shaft, and thereby extends and widens the range of the plug positions in which an external rotative force applied to the shaft, as by a valve actuator, can uniquely determine, and exert exclusive control over, the shaft and plug positions.

5 Claims, 6 Drawing Figures

500
ECCENTRIC ROTARY VALVE WITH CONTROL-IMPROVING WING MEMBER

This is a continuation of application Ser. No. 811,536 filed on June 30, 1977 now abandoned.

BACKGROUND OF THE INVENTION

1. Field of the Invention

The present invention relates generally to fluid flow control valves of the type wherein a member is moved to various positions between open and closed positions in order to adjust the flow rate of a fluid flowing through the valve. Specifically, the invention relates to those of such valves which are of the so-called eccentric rotary type, wherein the moved member is a plug which is positioned by being rotated about an axis which is normal to, and is offset from, the axis of the cooperating valve seat. More specifically, the invention relates to valves of the last-noted type in which the rotating and positioning of the plug about its rotational axis is desirably effected by an actuator which must establish a discreet plug position, and corresponding valve opening, for each of a plurality of values of a controlling signal, such as a controlling air pressure, which is applied to the actuator.

2. Description of the Prior Art

In the known valves of the type last identified above with which I am familiar, the plug is carried by a supporting means which, in turn, is secured to a shaft. The latter is rotated by the valve actuator about the above-noted rotational axis in order to move the plug into the desired one of its positions. That position is the one which corresponds to the existing value of the control signal, such as a controlling air pressure, which is applied to the actuator. The intention is that each such control signal value provides a corresponding or unique plug position or plug or valve opening which produces a corresponding, desired flow rate for the fluid passing through the valve. A typical example of such a valve is the valve which is disclosed in the Myers U.S. Pat. No. 3,963,211, and a typical example of such an actuator in the air-operated actuator which is disclosed in the Smith U.S. Pat. No. 3,985,151. Although, in the interest of clarity and simplicity, the invention will be described in connection with a valve which is shown as being actuated by an air-operated actuator, it is to be understood that the invention is applicable as well to valves which are actuated by other types of actuators, or by other means.

With respect to the known valves of the type being considered, it has been found in practice that the actuator loses control of the plug position for plug positions lying in a so-called unstable control region which exists between the valve-closed and valve-open positions of the plug. For convenience, this region will be referred to hereinafter simply as the unstable region. The location of this region in the range of plug movement or travel varies from one valve arrangement to another, and is usually expressed in degrees of plug rotation from the valve-closed position.

When the plug is moved into the unstable region in a given situation, the plug can have more than one position for each value of the controlling air pressure which is applied to the actuator. Consequently, for plug positions in this region, the plug position is no longer uniquely related to the value of the controlling air pressure, and control of the plug position and amount or degree of valve opening are lost. As will be explained more fully hereinafter, it is my understanding that this is due to the bistable nature or characteristic of a rotative force which the flowing fluid causes the plug to exert on its shaft, which force, at a so-called critical position of the plug, passes through a minimum which gives the force its bistable nature with respect to the plug position and establishes the unstable region.

Since control of the plug position by the actuator is not obtainable for plug positions lying in the unstable region, it has been necessary with the known valves to limit the extent or degree of valve opening to that which does not cause the plug to move into the corresponding unstable region. This has amounted to a serious practical shortcoming for the known valves, since it is usually desirable to be able to open and control the opening of a valve up to its full capacity, and since the positions of the unstable regions in the known valves are usually such as to prevent those valves from being used over plug opening ranges which are commensurate with the sizes and hence full capacities of the valves. In short, said shortcoming has prevented the use of the known valves to the full extent of their theoretical capabilities.

It has been proposed in the past to mitigate the effects of the above-noted shortcoming by increasing the spring force which is provided in the actuator in opposition to the controlling air pressure, thereby to shift the unstable region somewhat in the valve-open direction. Such a procedure has the practical disadvantage of requiring a corresponding increase in the force which the actuator must exert in opposition to the spring force, and hence of requiring a corresponding increase in the size and cost of the actuator.

Another shortcoming of the known valves of the type being considered which has prevented the realization of their potential capabilities is their use, in achieving the rotative support of their plugs, of force transmitting or coupling members which appear in flow-impeding positions in the fluid flow path, particularly in the main portion of the fluid flow. An example of such a member is the member 42 of the valve of the above-noted Myers patent. Such a member is undesirable to the extent that it impedes the fluid flow through the valve, and hence reduces the flow capacity of the valve below its otherwise available value.

SUMMARY OF THE INVENTION

Accordingly, it is an object of the present invention to provide an improved valve of the above-noted type which is not subject to the described shortcomings of the known forms of valves of that type. Thus, it is an object of the invention to provide an improved eccentric rotary valve which exhibits a controllable plug position range and a flow capacity which are significantly greater than those provided by the known forms of valves of the same nominal sizes. A more specific object of the invention is to provide such an improved valve wherein flow impedance by the coupling portion of the plug rotating means is minimized, and wherein the range of controllable plug movement between the valve-closed position and any unstable region is significantly increased in comparison to the known valves of equivalent size, without requiring an increase in the actuator force and size needed to move the plug.

To the end of accomplishing the above-noted and other desirable objects, the improved valve according to the invention includes a wing member which is attached to the plug supporting and rotating means and which appears in the fluid flow path as the plug moves out of its closed position. Briefly, this wing member is so positioned on the supporting means, and is so shaped, that it both acts as a rotative force coupler for the supporting means, and exerts a rotative force on the plug shaft in the presence of the fluid flow along the flow path. This force is one which acts in conjunction with the above-noted plug-produced force to shift the unstable region away from the valve-closed position so as to remove said region from the desired range of plug positions, thereby desirably extending and widening the range of controllable plug positions. Moreover, said wing member accomplishes the foregoing with a minimum of interference with the fluid flow.

BRIEF DESCRIPTION OF THE DRAWINGS

A better understanding of the present invention may be had from the following detailed description when read in connection with the accompanying drawings, wherein.

DETAILED DESCRIPTION

The Construction of the Valve and Actuator of FIGS. 1 through 5

The above-noted preferred form of valve chosen to exemplify the improved valve according to the invention will first be described with reference to FIGS. 1 through 3. In those figures, the valve is shown as including a casing, body, or housing 1 which contains and defines a fluid flow path 3. A seat 5 is held in place within the housing 1, with its axis substantially along the axis of the flow path 3, by a threaded retaining ring 7. For clarity, the seat 5 and the adjacent portions of the housing 1 are omitted from the top view of the valve presented in FIG. 2.

Figure 1:
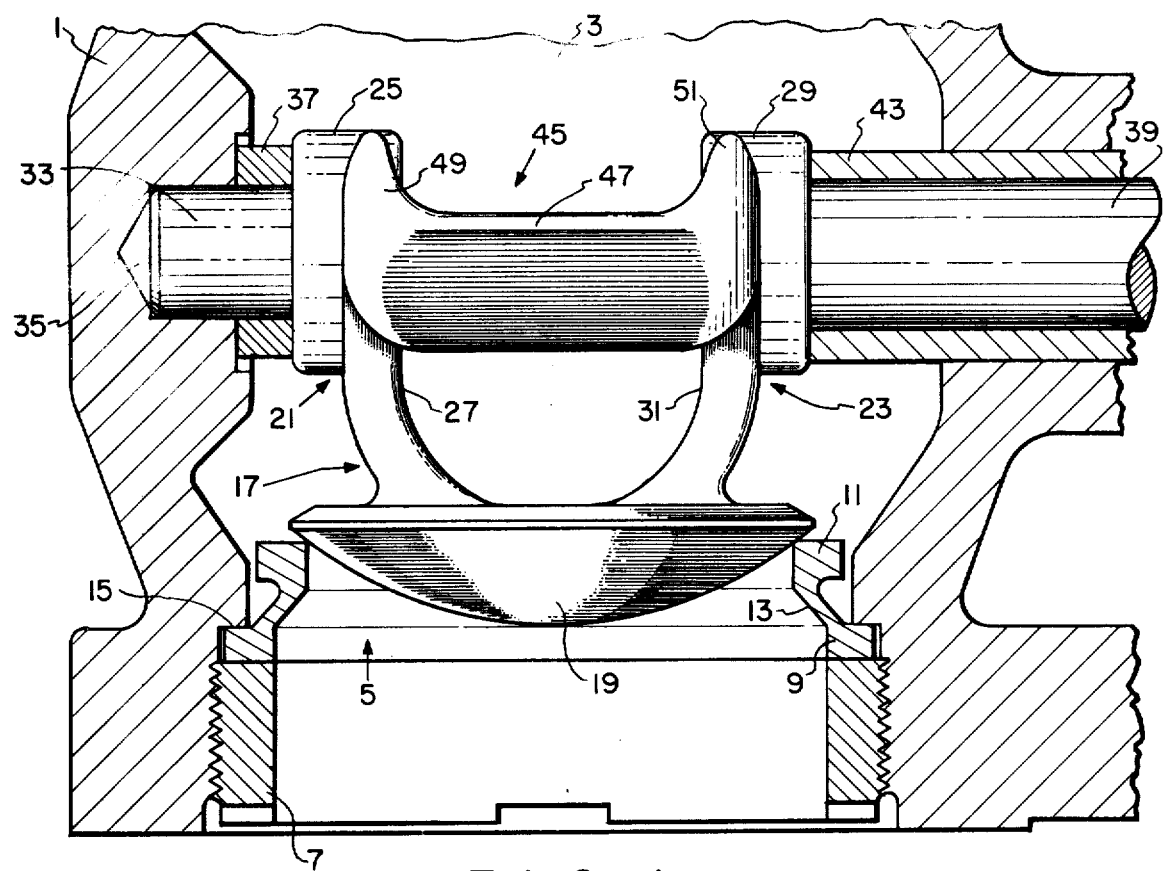
FIGS. 1, 2, and 3 are respective front elevation, top, and side, partially sectional, views of a preferred form of the above-noted improved valve according to the present invention, said views showing the valve plug in its closed position.
Figure 3:
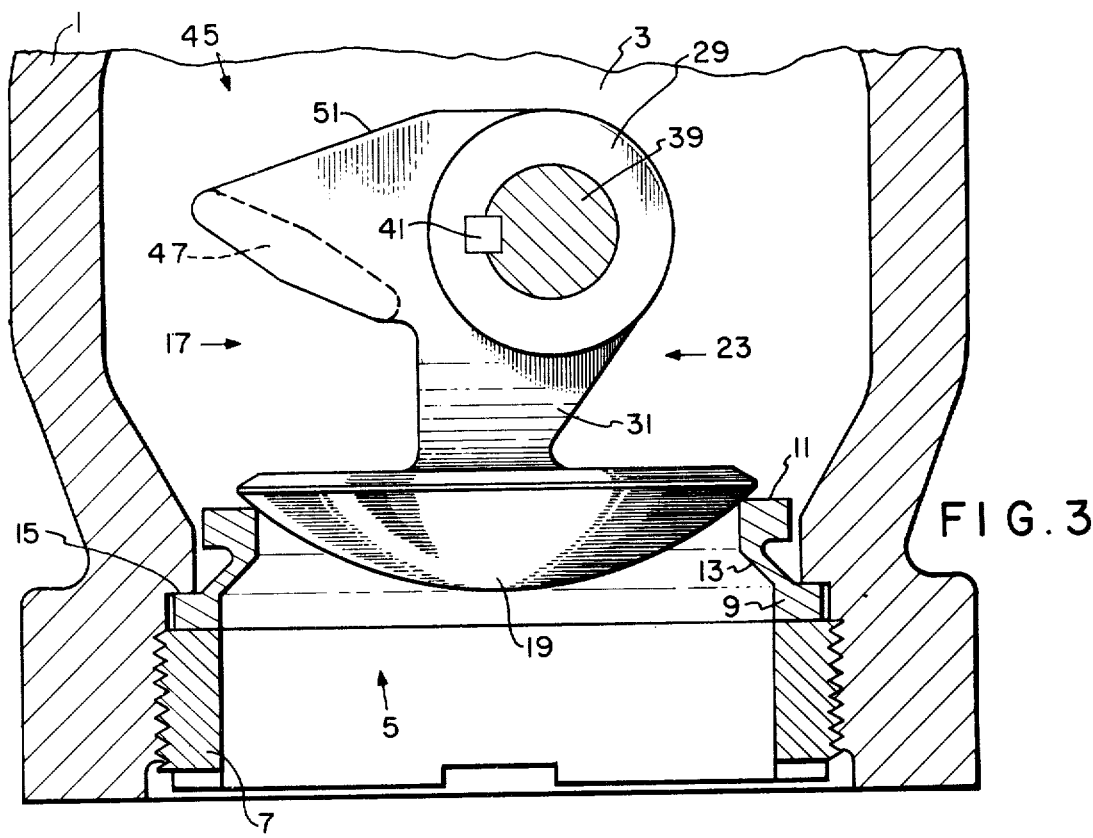

As shown in FIGS. 1 and 3, the seat 5 is a unitary member of hollow cylindrical form having one end portion shaped to form an annular base portion 9, having the opposite end portion shaped to form a rigid annular seating portion 11, and having the annular portion intermediate the portions 9 and 11 shaped to constitute an annular resilient connection portion 13. The retaining ring 7 holds the seat 5 within the housing 1 by clamping the base portion 9 against a shoulder 15 formed in the housing 1.

The plug means of the valve being described is shown at 17 and includes a plug 19 and plug supports 21 and 23. The support 21 consists of a circular portion 25 which is connected to the plug 19 by an arm portion 27. Similarly, the plug support 23 includes a circular portion 29 and an arm portion 31 which connects the portion 29 to the plug 19. The circular portion 25 is supported by, and free to rotate on, a stub shaft or stud 33 which is fixed in a hole 35 in the housing 1. A collar 37 surrounds the stud 33 to space the portion 25 from the inner wall of the housing 1.

The circular plug support 29 is fixed on the end of a shaft 39 by means of a key 41, which is illustrated in FIG. 3. The shaft 39 is supported for rotation within a sleeve 43 which is secured in, and passes through, an opening in the housing 1. The shaft 39 is rotatable on an axis which coincides with the axis of the stud 33 and which, as shown in FIG. 3, is normal to and spaced from the axis of the seat 5.

A wing member 45 is secured between the plug support portions 25 and 29. Specifically, the wing member 45 includes a wing portion 47 which terminates at one end in a connecting portion 49 secured to the plug support portion 25, and which terminates at its opposite end in a connecting portion 51 secured to the plug support portion 29. As can be seen best from FIG. 3, the wing portion or wing 47 is located within the flow path 3, and is of a bar-like construction having its longitudinal axis extending between the portions 49 and 51 and extending normal to the axis of the flow path 3. As can also be seen best from FIG. 3, the wing 47 has a cross section of the form of a centrally-expanded oval, or a flat diamond with rounded ends.

Figure 2:
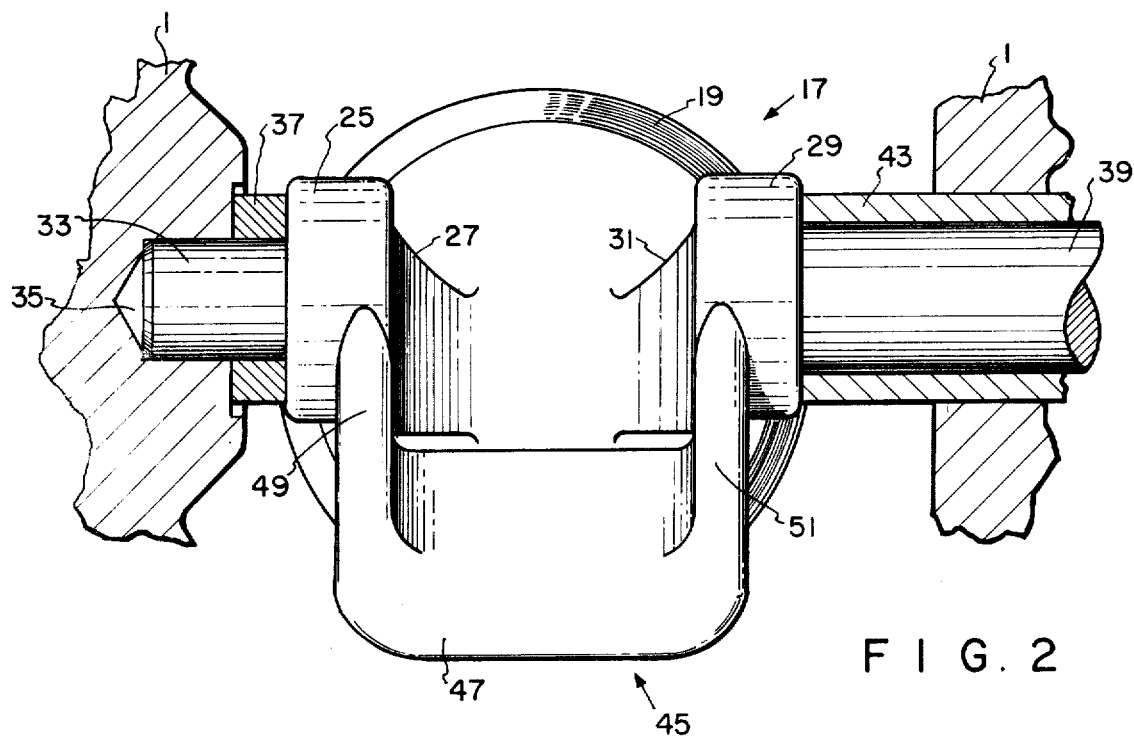
Figure 4:
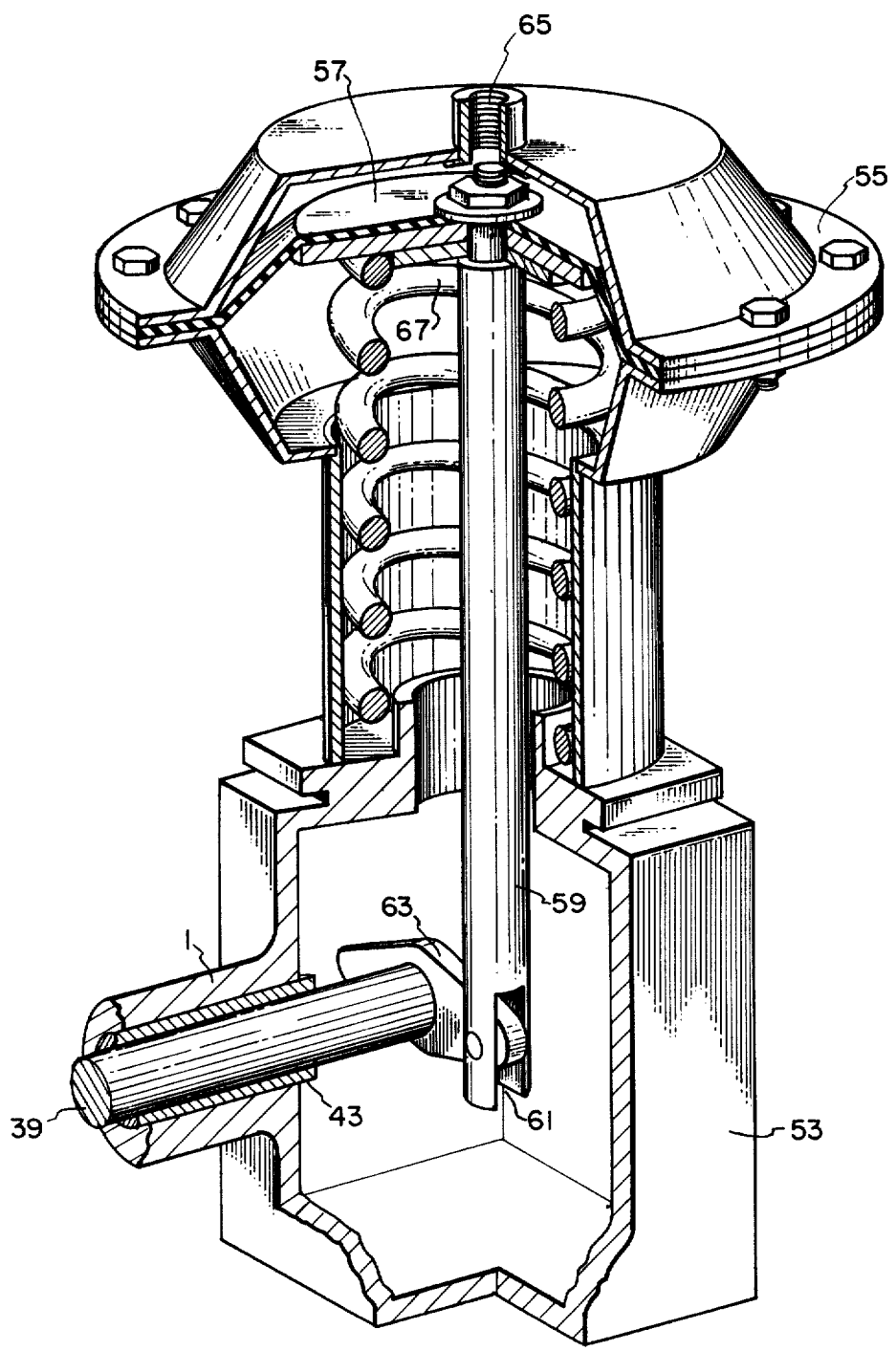
FIG. 4 is a partially sectional view of a typical air-operated actuator for moving the plug of the valve of FIGS. 1 through 3.

The valve actuator illustrated in FIG. 4 is shown as a typical device for rotating the shaft 39 of the valve of FIGS. 1 through 3 so as to position the plug 19 in accordance with the value of a controlling air pressure applied to the actuator. To this end, the shaft 39 and the sleeve 43 extend from the valve housing 1 into a body 53 of the actuator, and a portion of the housing 1 which encases the sleeve 43 and the shaft 39 is secured to the outer face of the body 53, all as shown in FIG. 4.

In addition to the body 53, the actuator of FIG. 4 includes a diaphragm housing 55 which contains a diaphragm 57. The latter is attached to the upper end of a rod 59, the lower end of which contains a slot 61. One end of a lever or arm 63 is pinned or otherwise secured for rotation within the slot 61. The other end of the arm 63 is attached to the end of the shaft 39 which extends into the body 53. This construction is such that downward movement of the rod 59 moves the arm 63 downward, and causes the shaft 39 to rotate in a counterclockwise direction as viewed from the right of the actuator toward the valve. This direction of view will be referred to hereinafter simply as being made "toward the valve."

The upper wall of the diaphragm housing 55 is provided with a threaded connection 65 which communicates with the fluid chamber that is formed between said upper wall and the upper surface of the diaphragm 57. The connection 65 is provided to receive an air line, not shown, which supplies to the actuator the controlling air or air pressure which is to determine the plug position and hence the degree or extent of opening of the valve. A spring 67 acts upwardly on the lower surface of the diaphragm 57, in opposition to the diaphragm force produced by the controlling air pressure.

For purposes of illustration and description, it has been chosen herein to consider the actuator and valve of FIGS. 1-4 as being so interconnected and related that the valve is operated or controlled in the "air-to-close" mode. Consequently, when the controlling air pressure applied by way of the connection 65 has its maximum or valve-closed value, the diaphragm 57 is forced to its most downward position against the action of the spring 67. For this position of the diaphragm 57, the rod 59 and the arm 63 also occupy their most downward positions, and the shaft 39 occupies its most counter-clockwise position as viewed toward the valve. For this position of the shaft 39, the plug 19 occupies its valve-closed position of FIGS. 1 through 3.

Figure 5:
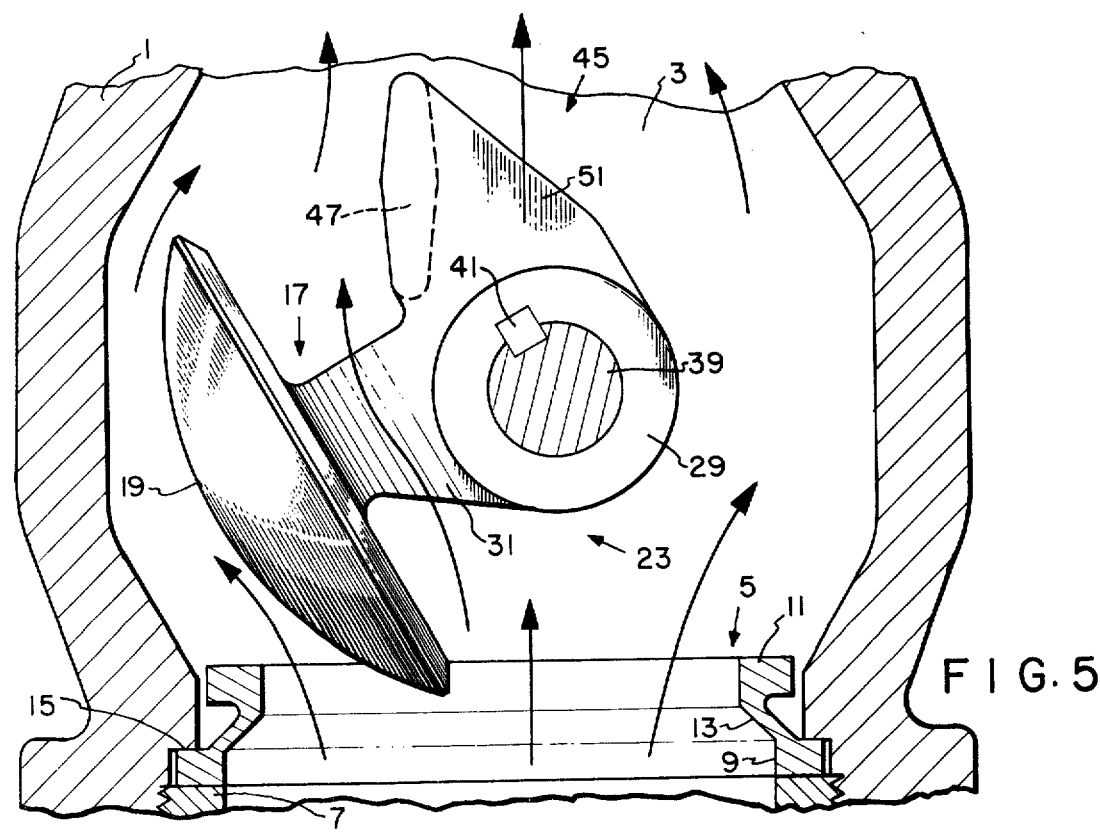
FIG. 5 is a side view similar to that of FIG. 3 but showing the valve plug in an open position.

As the controlling air pressure progressively decreases, the spring 67 correspondingly forces the diaphragm 57, the rod 59, and the arm 63 upward, thereby causing the shaft 39 to rotate correspondingly in the clockwise direction as viewed toward the valve. This, in turn, causes the plug 19 to rotate correspondingly in the clockwise direction from its closed position illustrated in FIGS. 1 through 3 to its open position illustrated in FIG. 5. The latter shows the plug 19 in the one of its open positions which is considered to correspond to the largest valve opening which is desired for the illustrated valve. When the plug 19 has the position illustrated in FIG. 5, it is assumed that the actuator components have the respective positions illustrated in FIG. 4. For this valve-open position of the plug 19, the transverse dimension of the wing 47 lies substantially along the flow path 3, as is illustrated in FIG. 5.

Since the present invention pertains to the illustrated internal portions of the valve of FIGS. 1 through 3 and 5 which have been described above, those portions of the housing 1 which are of conventional form, and whose illustration is not necessary in imparting a complete understanding of the invention, have been omitted from the drawing in order to avoid unduly complicating the latter. It is to be understood, however, that the housing 1 is deemed to include the usual portions, including flange and shaft sealing portions, which are conventionally included in valves of the disclosed type. Such portions may well be of the form disclosed in the above-noted Myers patent.

The Operation of the Valve and Actuator of FIGS. 1 through 5

Figure 6:
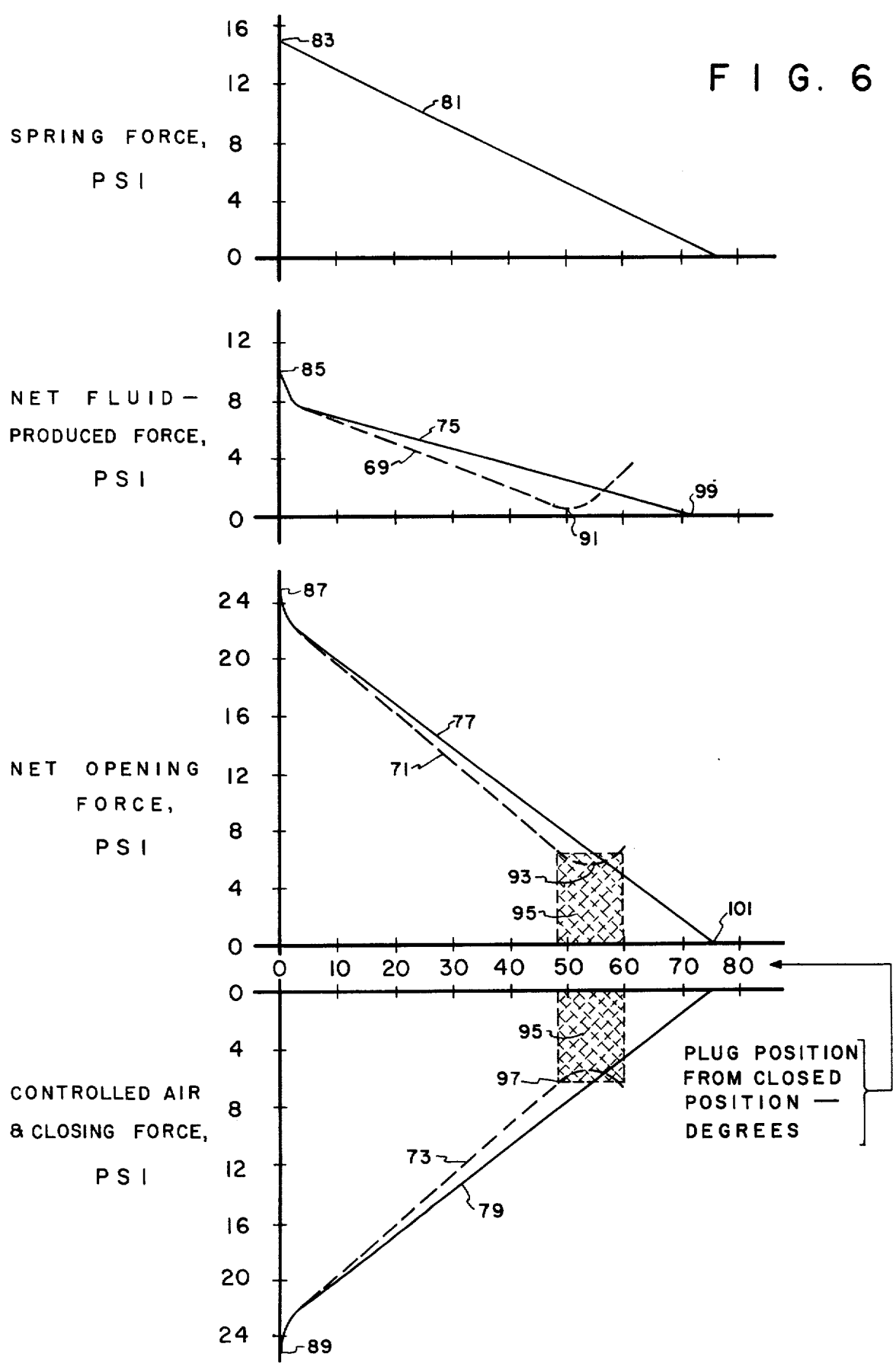
FIG. 6 is a series of curves which illustrate the operation of the valve of FIGS. 1 through 3 and 5 under the control of the typical actuator of FIG. 4.

The manner in which the above-described valve construction provides a significantly wider range of controllable plug positions than is provided by the previously known constructions will now be described. This will be done by describing the valve operation, or, more specifically, the control of the plug position, which the FIG. 4 actuator effects for an assumed typical situation and set of conditions which are illustrated by the curves of FIG. 6. In connection with said description, it will be assumed that the valve is connected in the conventional manner in a fluid flow line in which the fluid flows upward or in the "under the seat" direction which is illustrated by the flow arrows in FIG. 5. It will also be assumed that a controlling air pressure is applied to the actuator connection 65, and that the positions of the plug 19, and hence the degrees of valve opening and the rates of fluid flow through the valve, are to be determined and established by the values of said air pressure.

In the following description, rotative forces applied to the shaft 39 in the plug and valve-opening or clockwise direction will be referred to simply as opening forces, and such shaft rotative forces in the opposite or counter-clockwise direction will be referred to simply as closing forces. Further, the valve operation will first be described as though the wing member 45 were not present in the valve and, therefore, as though the valve were of the previously known type and subject to the above-described unduly limited control range shortcoming. This initial descriptive portion will, by contrast, complement the succeeding descriptive portion which will cover the superior operation of the valve that is obtained as a result of the inclusion of the wing member 45.

In accordance with the foregoing, the FIG. 6 curves for the assumed typical situation include the dashed-line curves 69, 71, and 73 which illustrate the plug position control obtained in the absence of the wing member 45. FIG. 6 also includes the solid line curves 75, 77, and 79 which illustrate the respective relationships illustrated by the curves 69, 71, and 73 but for valve operation in the presence of the wing member 45. FIG. 6 further includes a curve 81 which applies to the valve operation both without and with the wing member 45.

Specifically, the curve 81 shows the relationship between the position of the plug 19 and the value of the opening force exerted by the actuator spring 67. The curves 69 and 75 show the relationship between the position of the plug 19 and the value of the net opening force exerted by the fluid. In the case of the curve 69, said force is that due to the plug 19, whereas in the case of the curve 75, said force is the resultant of those due to the plug 19 and the wing 47. The curves 71 and 77 show the net or resultant of the opening forces exerted by the spring 67 and the fluid. Finally, the curves 73 and 79 show the relationship between the position of the plug 19 and the closing force exerted by the controlled air pressure by way of the diaphragm 57. With respect to each of the curves 69–81, the plug position is expressed in terms of degrees of rotation from the valve-closed position, and all forces are expressed in pounds per square inch (PSI), as is customary in describing valve operation.

To begin the description of the operation of the valve in the assumed absence of the wing member 45, it is also assumed that the plug 19 is in its 0° or valve-closed position which is illustrated in FIGS. 1 through 3. For this plug position, the plug 19 sealingly engages the seat portion 11, and the fluid is prevented from flowing through the valve. At this time, the spring 67 is exerting an opening force of a value which is represented by the point 83 on the curve 81, and the fluid is exerting an opening force of a value which is represented by the point 85 of the curve 69. These two opening forces combine to exert a resultant or net opening force of a value which is represented by the point 87 of the curve 71. The noted closed position of the plug 19 is maintained at this time by a closing force of a value which is represented by the point 89 of the curve 73, which value is shown as being equal and opposite to the value 87 of the net opening force curve 71. The closing force values represented by the curve 73 are those produced by the controlling air pressure applied to the actuator connection 65, and, ignoring the effects of friction, the closing force curve 73 is a mirror image of the net opening force curve 71.

It is assumed now that the controlling air pressure is progressively reduced, thereby causing the closing force to decrease progressively. Due to the actions of the spring 67 and the fluid acting on the plug 19, as shown by the respective curves 81 and 69, the plug position is progressively moved in the valve-open direction, as shown by the curve 73. Consequently, the plug 19 is progressively moved away from its initial sealing engagement with the seat portion 11, and a progressively increasing flow of fluid upward through the valve is established.

As shown by the curve 69, the opening force, or fluid-produced plug force exerted by the plug 19, progressively decreases, as the plug position is progressively advanced, until a plug position is reached at which the plug force passes through a minimum. This occurs at a point 91 on the curve 69. Thereafter, further movement of the plug in the valve-open direction causes the plug force to increase again. This passage through a minimum value gives the plug force its above-noted bistable characteristic or bistable relationship to the plug position, which is shown by the valley in the curve 69.

The above-noted bistable characteristic of the curve 69 is, of course, reflected in the resultant or net opening force curve 71, wherein it causes the curve 71 to pass through a corresponding minimum value at a critical point 93 at approximately the 55° position of the plug. This establishes a potentially unstable region which, for the example being considered, is shown by the cross-hatched areas 95 under curves 71 and 73.

As previously noted, for plug positions in the unstable region 95, the plug 19 can have more than one position for each value of the controlling air pressure, as is shown by the curve 73. Consequently, for plug positions in the region 95, the plug position is no longer uniquely related to the value of the controlling air pressure, and control of the plug position and of the amount or degree of valve opening are lost. For the example being considered, therefore, the controllable range of plug positions ends at a plug position of approximately 47° at a point 97, and the plug 19 cannot be opened past this point if control of the plug position by the actuator is to be maintained. In short, the maximum usable plug opening for the present example is approximately 47°. The controllable plug opening could, of course, be extended to the point 93, corresponding to the 55° position, by applying a suitable restraint to movement of the plug past the 55° position.

Turning now to the description of the operation of the valve containing the wing member 45, it is again assumed at the outset that the plug is in its 0° or valve-closed position which is illustrated in FIGS. 1 through 3. For this plug position, the spring 67, as before, is exerting an opening force of a value which is represented by the point 83 of the curve 81. Also as before, the fluid is exerting an opening force of a value which is represented by the point 85, which is common to both of the curves 69 and 75. These two opening forces combine to exert a net opening force of a value which is again represented by the point 87, which is common to both of the curves 71 and 77. Again, the noted closed position of the plug 19 is maintained at this time by a closing force of a value which is represented by the point 89, which is common to both of the curves 73 and 79. As in the case of the curves 73 and 71, the curve 79 is a mirror image of the curve 77.

It is assumed now that the controlling air pressure is progressively reduced, thereby causing the closing force to decrease progressively and causing the plug position to advance progressively as shown by the curve 79. As a result, the plug 19 is again progressively moved away from its initial sealing engagement with the seat portion 11 toward the open position illustrated in FIG. 5, and a progressively increasing flow of fluid upward through the valve is established.

As shown by the curve 75, the net fluid-produced opening force again decreases progressively as the plug position is progressively advanced. Now, however, the net fluid-produced force includes the opening force produced by the wing 47, whereby, as shown by the curve 75, this net force no longer passes through a minimum in the plug position range being considered, but is still progressively decreasing at the point 99 at which the curve 75 intersects the zero axis.

The noted absence of the minimum and of the resulting bistable characteristic of the curve 69 from the curve 75 causes the net opening force curve 77 to reach the zero axis at a point 101 without having experienced any minimum or bistable characteristic. Consequently, there is no unstable region associated with the net opening and closing forces for a controllable plug position range which extends to approximately 75°. In short, the maximum usable plug opening in the presence of the wing 47 is in excess of 70°. This represents a significant performance improvement with respect to the maximum usable plug opening of approximately 47° or 55° which was attainable when the wing 47 was absent.

It is believed that the foregoing description makes it clear that the wing 47 effectively shifts the plug force minimum and the unstable region away from the valve-closed position so as to effectively remove said region from the desired range of plug positions and hence to extend and widen significantly the range of controllable plug positions. Although that description dealt specifically with the plug movement in the opening direction and for a progressively decreasing controlling air pressure, the FIG. 6 curves show that, for plug positions lying on the curve 79, each change in the value of the controlling air pressure moves the plug to a position which corresponds to the new value of that pressure. Thus, increases in that value cause the shaft 39 to rotate in the valve-closed direction to move the plug 19 into corresponding positions between the valve-open and valve-closed positions, while decreases in that value cause the shaft 39 to rotate in the valve-open direction to move the plug 19 into corresponding positions between the valve-closed and valve-open positions. Moreover, equivalent operation takes place when the valve and actuator are connected and operated in the "air to open" mode.

In the above-described operation, the wing 47 provides the noted desirable widening of the range of plug positions in which the actuator can uniquely determine the plug position. Additionally, the wing 47 serves to rotatively couple the plug support portion 25 to the driven plug support portion 29 so that the shaft 39 effectively drives and rotates both of the portions 25 and 29. Moreover, the wing 47 accomplishes this with a minimum of interference with the flow of the fluid through the valve, as can readily be seen by noting from FIGS. 3 and 5 the positions which the wing 47 assumes in and between the valve-closed position of FIG. 3 and the valve-open position of FIG. 5. It is noted in this connection that the wing 47 is substantially out of the main portion of the fluid flow until it assumes the in-line position shown in FIG. 5.

It is believed to be clear from the foregoing description that the described valve fulfills the objects stated herein. Thus, it has been shown that the described valve construction including the wing member 45 significantly increases the range of controllable plug movement without requiring an increase in the actuator force, and also provides a desirable rotative coupling between the two plug supports, all with a minimum of interference with the fluid flow.

The embodiments of the invention in which an exclusive property or privilege is claimed are defined as follows:

1. A fluid flow controlling rotary valve comprising
a housing containing a fluid flow path with a central axis,
a valve seat located within said housing along said flow path,
a plug means having a sealing face cooperating with said valve seat in the closed position to block said fluid flow path,
a support shaft arranged to carry said plug means and being rotatable on an axis which is normal to and spaced from the axis of said valve seat so that rotation of said shaft moves said plug means relative to said valve seat and
a wing member means attached to said plug means for movement therewith in said fluid flow path and located entirely on one side of an axis of said plug means, said plug means axis coinciding with said central axis when said plug means is in said closed position; said wing member being arranged to exert a rotative force on said support shaft in the presence of fluid flow along said fluid flow path which force progressively decreases as said plug means moves progressively in a valve opening direction; said plug means exerting a first rotative force on said shaft in a valve opening direction in the presence of fluid flow along said flow path and said wing member means being constructed and arranged to exert a second rotative force on said shaft in said valve opening direction in the presence of fluid flow along said flow path, said first and second forces thereby acting together to produce a net unidirectional force to move said plug toward a valve opening position.

2. A fluid flow controlling valve as set forth in claim 1 wherein said plug means first rotative force exerts a rotative force on said shaft during a valve opening operation in the presence of fluid flow along said fluid flow path which force exhibits a bistable relationship with respect to the position of said plug means with a predetermined range of positions of said plug means and said wing member means second rotative force exerts a rotative force on said shaft acting to remove the bistable relationship from the net rotative force exerted on said shaft within said predetermined range of positions of said plug means to thereby achieve said net unidirectional force.

3. A fluid flow controlling rotary valve as set forth in claim 1 wherein said wing member includes a bar-like construction extending between a pair of support legs attached to said plug means and having a generally oval cross-section.

4. A fluid flow controlling rotary valve as set forth in claim 3 wherein a major transverse dimension of said bar-like portion lies substantially parallel to said flow path when said plug means occupies a valve open position.

5. A fluid flow controlling rotary valve as set forth in claim 4 wherein said major transverse dimension of said bar-like portion is at a predetermined angle to said flow path when said plug means occupies a valve closed position.

* * * * *